Oct. 17, 1950 E. D. McARTHUR ET AL Re. 23,284

ULTRA HIGH FREQUENCY ELECTRIC DISCHARGE DEVICE
AND CAVITY RESONATOR APPARATUS THEREFOR
Original Filed Jan. 29, 1944

Inventors:
Elmer D. McArthur,
James E. Beggs,
by Harry E. Dunham
Their Attorney.

Reissued Oct. 17, 1950 Re. 23,284

UNITED STATES PATENT OFFICE 23,284

ULTRA HIGH FREQUENCY ELECTRIC DISCHARGE DEVICE AND CAVITY RESONATOR APPARATUS THEREFOR

Elmer D. McArthur and James E. Beggs, Schenectady, N. Y., assignors to General Electric Company, a corporation of New York Original No. 2,446,017, dated July 27, 1948, Serial No. 520,240, January 29, 1944. Application for reissue July 21, 1949, Serial No. 106,090

11 Claims. (Cl. 315—39)

Figure 1:
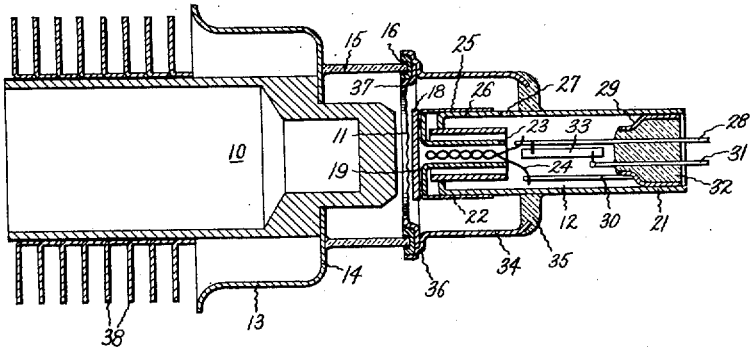

Matter enclosed in heavy brackets [ ] appears in the original patent but forms no part of this reissue specification; matter printed in italics indicates the additions made by reissue

Our invention relates to electric discharge devices for use at ultra-high frequencies and, in particular, to such devices for use under conditions having a high duty cycle or a substantially continuous operating period at full load.

It is an object of our invention to provide a new and improved high frequency electric discharge device.

It is another object of our invention to provide a new and improved ultra-high frequency electric discharge device suitable for use in connection with space-resonant cavities.

It is a further object of our invention to provide a new and improved ultra-high frequency electric discharge device of the space-resonant type.

One of the features of our invention is the employment of three telescoped and radially spaced conductors which define space-resonant cavities between them and having an electric discharge device which may be easily inserted into said cavities so that its grid is coupled to the intermediate conductor and its anode and cathode, coupled respectively to the outer and inner conductors. A portion of the tube sealing means comprises a metallic cylinder concentrically spaced from the cathode which forms therewith a portion of one of the space-resonant cavities.

Another feature of our invention is the provision of a cylindrical anode having a transversely extending portion spaced closely to its electron receiving end which serves to remove the ultra-high frequency currents from the anode structure as shortly as possible after entering therein, the transversely extending portion forming means for connecting the anode to one of the space-resonant cavities and to separate the ultra-high frequency currents from thermal currents flowing longitudinally of the anode. Cooling means, also attached to the anode at a point near its electron receiving end and wholly external of the space-resonant cavities, provide means for improving the operation of the device either under a high duty cycle or continuous service.

It is another object of our invention, therefore, to provide a new and improved ultra-high frequency electric discharge device of the space-resonant type in which division of high frequency and thermal currents flowing in the anode is made at a point close to the electron receiving surface of the anode.

It is a still further object of our invention to provide a new and improved cooling means for an ultra-high frequency electric discharge device of the space-resonant type.

The features desired to be protected herein are pointed out with particularity in the appended claims. The invention itself, together with further objects and advantages thereof, may best be understood by reference to the following description taken in connection with the accompanying drawing in which Fig. 1 diagrammatically illustrates an electric discharge device suitably embodying our invention and Fig. 2 diagrammatically illustrates the electric discharge device of Fig. 1 as applied to a space-resonant system.

Figure 2:
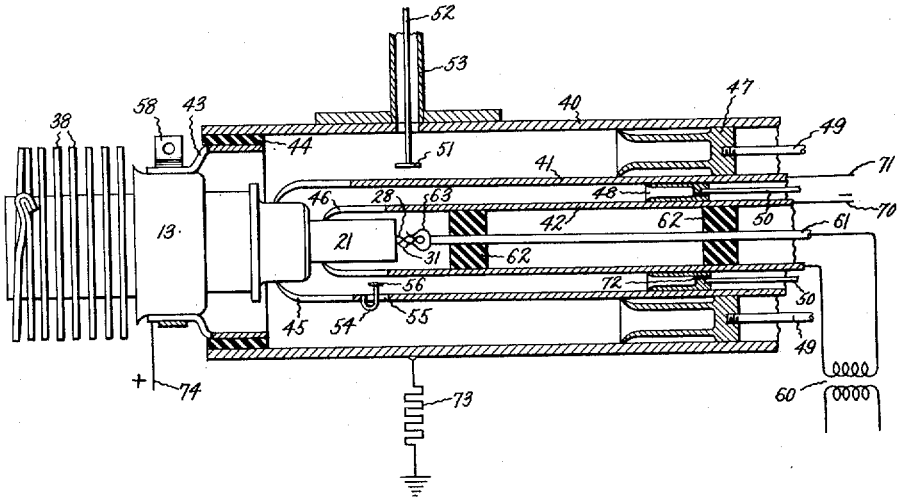

Referring particularly to Fig. 1, there is shown an ultra-high frequency electric discharge device having an anode 10, a grid or control electrode 11, and a cathode 12 arranged in end-to-end order. The anode and cathode are in the form of cylindrical members substantially coaxially aligned and having closed adjacent ends in opposed closely spaced relation to form electron emitting and electron receiving surfaces. Concentrically surrounding the anode 10 is a metallic cup-shaped member 13 having an end portion 14 extending transversely to the axis of the anode 10 and secured thereto, as by soldering or brazing, to function as an integral part of the anode structure. For reasons to be pointed out later, the transversely extending wall 14 is attached to the anode 10 as closely as possible to its right-hand or electron receiving end. An insulating cylinder 15 concentrically surrounding anode 10 is hermetically sealed at one of its ends to the transverse wall 14 and has hermetically attached to its opposite end a metallic ring 16.

The cylindrical cathode structure 12 is of the type disclosed in the copending application of James E. Beggs, Serial No. 522,097, filed February 12, 1944 *and now U. S. Patent No. 2,445,993, granted July 27, 1948*, and assigned to the assignee of the present invention. This cathode structure comprises a plate or disk 18 formed of a suitable metal, such as nickel, and coated on its outer or left-hand surface with a layer 19 of suitable electron emitting material, such as, for example, mixed barium and strontium carbonates. The disk 18 is supported from a metal tube 21 by means of a tubular sleeve 22 of thin fernico foil, the latter having one of its ends welded to the outer surface of tube 21 and having at its other end an inwardly directed flange welded between the disk 18 and a metallic eyelet 23 which surrounds a tungsten heating member or filament 24. The metal tube 21, at its left-hand end, has an inwardly extending flange 25 which is welded to a sleeve 26 to maintain the sleeve in spaced relation with the eyelet 23. In this composite cathode structure, the fernico foil 22 serves to isolate thermally the nickel disk 18, heated by radiation and conduction from heater filament 24, from the metal cylinder 21 which extends outside of the enclosed region of the electric discharge device. The metal sleeve 26, formed preferably of a suitable material, such as nickel, conserves the heat of the filament by reflecting it back to the cathode surface. One end of the filament 24 is connected to a conductor 28 sealed in a disk 32 of insulating material, such as glass, and retained within a metal sleeve 29 soldered to the inner surface of tube 21. The other end of the filament 24 is connected to the sleeve 29 by means of conductor 30. An additional conductor 31, also sealed within the glass disk 32, serves both to support and convey electric currents to one end of a suitable getter 33, the other end of the getter being supported by and electrically connected to the conductor 28. A hole 27 in metal cylinder 21, provides communication between the enclosed region of the electric discharge device and the getter 33 whereby final vacuum conditions of the electron tube are established by the getter when it is flashed by current supplied over conductors 28, 31.

Concentrically surrounding the composite cathode structure described above is a metallic sleeve 34 having one of its ends supported by and hermetically sealed to a transversely extending disk 35 of insulating material, such as glass, the disk 35 surrounding and being hermetically sealed to the outer surface of metal tube 21. At its opposite end, the sleeve 34 has an outwardly directed flange 36 which partially overlies and is soldered to the metal ring 16 attached to this end of the insulating cylinder 17. Clamped, or otherwise secured, between the ring 16 and the flange 36 is a metallic ring 37 which functions to support the grid 11 between the anode 10 and cathode 12 in a desired spaced relation with these electrodes.

In the composite structure thus described, the glass cylinder 15, in conjunction with metallic members 14 and 16, the metal sleeve 34, and the glass disk 35 serve to support the electrodes of the electric discharge device in alignment and to provide a sealed region about these electrodes. At the same time, the metal sleeve 34 concentrically surrounding the left-hand end of the cathode cylinder 12 forms therewith a section of concentric transmission line or space-resonant cavity. The cup-shaped member 13, the metal sleeve 34, the ring 16, and the metallic tube 21 preferably are formed of a mechanically strong conducting material, such as copper- or silver-plated iron and the cylinder 15 and disk 35 are formed of a glass having substantially the same temperature coefficient of expansion as the metallic members and a low high frequency dielectric loss. One such glass suitable for this purpose and having the desired characteristics contains about 45% $SiO_2$, 14% $K_2O$, 6% $Na_2O$, 30% PBO, and 5% $CaF_2$. By this construction, therefore, the electrodes 10—12 are maintained in alignment and with substantially the same spacing for all operating temperatures of the electric discharge device. At the same time, at ultra-high frequencies, namely, frequencies at which the electromagnetic waves have a wave length of the order of a few centimeters, the losses due to the dielectric materials are kept to a low value.

In order to assist in cooling the anode 10 and to permit operation of the electric discharge device under conditions when the duty cycle is high, that is, under conditions when the device operates for long periods of time at loads approaching full load, cooling fins 38 of suitable material, such as copper, are helically wound around the left-hand end of the anode cylinder 10 and may be integrally attached to the anode 10, as by soldering. These fins extend along the outer surface of the anode 10 to a point as close as possible to the point of connection of the cup-shaped member 13. By this construction of the anode 10 and the elements 13 and 38, particularly useful and advantageous separation of the ultra-high frequency currents and the thermal currents in the anode structure is obtained. Thus, the high frequency currents due to the electrons flowing from the cathode 12 to the anode 10, because of skin effect at the ultra-high frequency at which the device is operated, flow along the outer surface of the anode 10 to the transverse metallic connection 14 by means of which they may be transmitted to output circuits. At the same time, the thermal currents transferring the heat generated at the electron receiving surface of the anode 10 to the exterior portion of the anode flow along the interior of the right-hand portion of the anode 10 to a point beyond the transverse member 14 where they are conducted to the cooling fins 38 through the good thermal contact between the left-hand portion of the anode 10 and these fins. In this way, the heat developed in the anode is transmitted easily by as short a path as possible to a point external to the tube and any resonant cavities associated therewith to be dissipated either solely by the fins 38 or by a stream of air directed across the fins 38.

With reference now to Fig. 2, there is shown the auxiliary or tuning space-resonant cavities which may be connected to the electric discharge device shown in Fig. 1 for resonating or tuning the circuits thereof and comprising three concentric and mutually telescoped conductors 40, 41, 42, suitably consisting of brass or copper. The outer cylinder 40 is coupled by means of the contact ring 43 for high frequency currents to the cup-shaped metallic member 13, in turn, integrally connected to the anode of the electric discharge device. The conductor 40 is insulated from contact ring 43 for unidirectional currents by a sleeve of insulation 44 and is capacitively coupled by means of this sleeve to the ring 43 for high frequency currents. Intermediate conductor 41 is conductively connected to the metal cylinder 34 by means of a plurality of spring-like contacts or fingers 45 at its left-hand end and, together with the conductor 40, defines a grid-anode cavity external of the electric discharge device. Inner conductor 42 similarly has a plurality of spring-like fingers or contacts 46 externally contacting the outer surface of the metallic tube 21 to define, with intermediate conductor 41 and the portion of concentric transmission line formed by metal tube 21 and metal cylinder 34 connected respectively to the cathode and grid, a space-resonant grid-cathode cavity.

There is also provided, in connection with the space-resonant cavities thus defined, means for tuning or controlling the natural resonance frequencies of the respective cavities and this means may take the form of the annular plungers 47, 48 which are positionable or slidable, respectively, along the inner surfaces of the cylinders 40, 41 and the outer surfaces of the cylinders 41, 42 being in close engagement with these cylinders in order to prevent any discontinuity in the conductive medium which defines the cavities. The plunger 47 may be positioned by any suitable mechanical expedient, such as the rod 49, and plunger 48 may be similarly positioned by means of rod 50. Energy may be extracted from the anode-grid space-resonant cavity by any suitable output electrode means, one form of which may be a capacity coupling defined by a metal plate 51 in spaced relation with the outer surface of the conductive tube 41 at a point of high electric field intensity. The plate 51 is connected to a coaxial transmission line comprising an inner conductor 52 and an outer conductor 53 conductively supported from the outer surface of cylinder 40. Coupling means between the anode-grid and grid-cathode cavities is provided by the loop 54 of conductive material connected to the outer surface of cylinder 41 and extending through a slot 55 in this cylinder. This loop terminates in a plate 56 within the grid-cathode cavity, which plate is in spaced relation with and capacitively coupled to the cylinder 42.

In the telescoped cylinder arrangement thus described, the left-hand extremities of the cylinders 40, 41, 42 are axially offset so as to provide a stepwise arrangement which is regressive as one proceeds from the outer cylinder 40 to the inner cylinder 42. This is for facilitating the combination of these cylinders with the electric discharge device shown in Fig. 1 and previously described. Thus, with this arrangement of telescoped cylinders carrying the contact fingers at their ends, the electric discharge device may be easily inserted into the cavities, the contact ring 43 fitting about the cup-shaped portion 13 of the anode and being clamped thereto by means of a clamping ring 58. As the cup-shaped member 13 is pushed into the ring 43, the spring fingers or contacts 45 engage the metal cylinder 34 which carries the grid or control electrode of the discharge device and the spring fingers 46 engage the cylindrical tube 21 of the cathode of the device.

Current for heating the cathode filament may be provided by means of the transformer 60 having one of the terminals of its secondary winding connected to cylinder 42 and the other terminal of its secondary winding connected to a conductor 61 concentrically supported within cylinder 42 by means of insulator 62 and terminating in a spring finger arrangement 63 which slips over the twisted ends of conductors 28, 31, these conductors having been twisted together after the getter 33 was flashed in the manufacture of the electric discharge device. The electric discharge device preferably is operated with the anode at ground potential, the cathode being maintained at high negative potential supplied thereto over a lead 70 connected to inner cylinder 42. Potential may be supplied to the grid of the device by means of cylinder 41 and lead 71 connected to the end thereof, the grid potential being isolated from the cathode potential by means of a layer or ring 72 of a suitable insulating material, such as mica, inserted in the plunger 48. The outer cylinder 40, because of its direct connection with cylinder 41 through the plunger 47, is at grid potential and may be connected to ground through a grid resistance 73.

Upon impressing a suitable unidirectional voltage between the lead 74 connected to the anode and lead 70 connected to the cathode, high frequency electromagnetic energy may be derived from the space-resonant system through the transmission line comprising conductors 52, 53. Because of the coupling loop 54 and the capacitive coupling arrangement 56 between the anode-grid and grid-cathode cavity, energy is fed back from the anode-grid to the grid-cathode cavities, maintaining the system in a state of oscillation. Operation or adjustment of the plungers 47, 48 controls the intensity or magnitude of the high frequency electromagnetic oscillations within the space-resonant system. The frequency of the energy derived from the space-resonant system may also be controlled by the adjustment of these plungers, which determines the natural resonance frequencies of the regions defined by the cylinders 40, 41, 42 and their associated electrodes.

When the system is to be used for amplifying of signals, input signals may be coupled into the cathode-grid cavity by any suitable coupling means such as a coaxial transmission line and a coupling loop and the cathode-grid cavity tuned to the frequency of these signals by means of the plunger 48. The intensity or magnitude of the output signals may be controlled by means of the plunger 47, which adjusts the tuning of the anode-grid cavity.

When the electric discharge device is operated at substantially equal load for a considerable period of time, it is preferable that auxiliary cooling means be used in conjunction with the fins. Because of the construction of the anode having the transverse member 14 connected near its electron receiving end to convey away almost immediately the ultra-high frequency currents to the space-resonant anode-grid cavity while the thermal currents flow through the anode to the fins so that the anode cylinder 10 is substantially completely external to the anode-grid cavity, it is possible to attach the thermally conductive means to the anode at a point very close to its electron receiving end and provide for more efficient and continuous loading of the electric discharge device at very short wave lengths.

Although, in the above-described embodiments of our invention, we have chosen to represent certain of the structural features as applied to a space-resonant system used as an oscillator or amplifier, it is readily apparent that the improved structures or systems which we provide may be applied with equal facility to space-resonant systems used for any other purpose. Furthermore, the electron discharge device illustrated in Fig. 1 may be employed with equal facility with open transmission lines or wired circuits.

While we have shown and described our invention as applied to a particular system embodying various devices diagrammatically shown, it will be obvious to those skilled in the art that changes and modifications may be made without departing from our invention and we, therefore, aim to cover in the appended claims all such changes and modifications as fall within the true spirit and scope of our invention.

What we claim as new and desire to secure by Letters Patent of the United States is:

1. A high frequency electronic discharge device comprising an anode cylinder, a cathode cylinder coaxially aligned therewith, said cylinders having adjacent closed ends in opposed spaced relation and constituting electron emitting and electron receiving elements of said device, a transversely extending insulating disc hermetically sealed to said cathode cylinder at a point spaced from said closed end, a metallic cylinder concentrically surrounding said cathode and extending longitudinally toward said end, said anode having a transversely extending portion spaced from said closed end, a cylindrical insulating member surrounding said anode cylinder and hermetically sealed between said transversely extending portion and said metallic cylinder, and means conductively connected to said metallic cylinder supporting a grid between said anode and cathode in spaced relation with said opposed ends.

2. A high frequency electronic discharge device comprising a cylindrical anode, a cylindrical cathode, and a grid supported [in alignment] *between said anode and cathode,* said anode having a transversely extending portion spaced longitudinally therealong from the end thereof nearer said cathode, an insulating cylinder concentrically surrounding said anode and hermetically sealed to said transversely extending portion, a metallic cylinder concentrically surrounding said cathode and having one of its ends hermetically sealed to said insulating cylinder, and a transversely extending annular member of insulating material hermetically sealed between said cathode and said metallic cylinder to maintain said anode and cathode in spaced relation, and means connected to said metallic cylinder and supporting said grid in alignment with said anode and said cathode.

3. A high frequency electronic discharge device comprising a cylindrical anode, a cylindrical cathode, and a grid supported [in alignment] *between said anode and cathode,* said anode having a transversely extending portion spaced longitudinally therealong from the end thereof near said cathode, an insulating cylinder concentrically surrounding said anode and hermetically sealed to said transversely extending portion, a metallic cylinder concentrically surrounding said cathode and having one of its ends hermetically sealed to said insulating cylinder, a transversely extending insulating disk hermetically sealed between said cathode and said metallic cylinder to maintain said anode and cathode in spaced relation, means connected to said metallic cylinder and supporting said grid in alignment with said anode and said cathode, and external cooling means connected to said anode.

4. A high frequency [cavity resonator system comprising] electric discharge device for use in a *cavity resonator system and comprising a* substantially cyindrical anode, a substantially cylindrical cathode coaxially aligned therewith and having one of its ends in opposed spaced relation with the adjacent end of said anode, said anode having a transversely extending portion spaced from said end, an insulating cylinder concentrically surrounding said anode and having one end hermetically sealed to said transversely extending portion, a metallic cylinder concentrically surrounding said cathode and having one of its ends hermetically sealed to said insulating cylinder, insulating means hermetically sealed between said cathode and said metallic cylinder at the other end thereof to maintain said anode and cathode in spaced relation, means conductively connected to said metallic cylinder [for] *and* supporting a grid between said anode and cathode in spaced relation with said opposed ends, said cathode and said metallic cylinder providing concentric terminals for connection with a grid-cathode cavity resonator, and a conductive cylinder coupled to said transversely extending portion and providing with said metallic cylinder concentric terminals for an anode-grid cavity resonator.

5. A high frequency cavity resonator *apparatus* [system] comprising an electric discharge device including a substantially cylindrical anode, a substantially cylindrical cathode coaxially aligned therewith and having one of its ends in opposed spaced relation with the adjacent end of said anode, said anode having a transversely extending portion spaced from said end, an insulating cylinder concentrically surrounding said anode and having one end hermetically sealed to said transversely extending portion, a metallic cylinder concentrically surrounding said cathode and having one of its ends hermetically sealed to said insulating cylinder, insulating means hermetically sealed between said *cathode* [anode] and said metallic cylinder at the other end thereof to maintain said anode and cathode in spaced relation, means conductively connected to said metallic cylinder [for] *and* supporting a grid between said anode and cathode in spaced relation with said opposed ends, said cathode and said metallic cylinder defining a portion of a grid-cathode cavity resonator, and conductive means coupled to said transversely extending portion and defining with said anode a portion of a cavity resonator.

6. A high frequency cavity resonator *apparatus* [system] comprising an electric discharge device including a substantially cylindrical anode, a substantially cylindrical cathode coaxially aligned therewith and having one of its ends in opposed spaced relation with the adjacent end of said anode, said anode having a transversely extending portion spaced from said end, an insulating cylinder concentrically surrounding said anode and having one end hermetically sealed to said transversely extending portion, a metallic cylinder concentrically surrounding said cathode and having one of its ends hermetically sealed to said insulating cylinder, insulating means hermetically sealed between said *cathode* [anode] and said metallic cylinder at the other end thereof and maintaining said anode and cathode in spaced relation, means conductively connected to said metallic cylinder and supporting a grid between said anode and cathode in spaced relation with said opposed ends, said cathode and said metallic cylinder defining a portion of a grid-cathode cavity resonator, conductive means coupled to said transversely extending portion and defining with said anode a portion of a second cavity resonator, and cooling means for said anode lying wholly externally of said resonators and formed integrally with said anode.

7. A high frequency cavity resonator *apparatus* [system] comprising an electric discharge device having a plurality of enclosed electrodes including an anode, a cathode, and a grid, a metallic cylinder concentrically surrounding said cathode and supporting said grid, insulating means hermetically sealed between said *metallic* cylinder and said cathode, an insulating cylinder hermetically sealed between said metallic cylinder and said anode, an inner, an outer, and an intermediate conductive cylinder, in telescoped relation concentrically surrounding said discharge device, said outer cylinder with said intermediate cylinder defining a grid-anode cavity resonator, said intermediate cylinder being conductively connected to said metallic cylinder, said intermediate cylinder with said inner cylinder defining a cathode-grid cavity resonator, and means for controlling the frequencies of said resonators comprising axially positionable tuning means supported between *said outer and intermediate*

*conductive cylinders and said intermediate and inner conductive cylinders respectively.* [the respective cylinders.]

8. A high frequency cavity resonator system comprising an electric discharge device having a plurality of enclosed electrodes including an anode, a cathode, and a grid, a metallic cylinder concentrically surrounding said cathode and supporting said grid, insulating means hermetically sealed between said *metallic* cylinder and said *cathode* [anode], an insulating cylinder hermetically sealed between said metallic cylinder and said anode, an inner, an outer, and an intermediate conductive cylinder, in telescoped relation concentrically surrounding said discharge device, said outer cylinder with said intermediate cylinder defining a grid-anode cavity resonator, said intermediate cylinder being conductively connected to said metalic cylinder, said intermediate cylinder with said inner cylinder defining a cathode-grid cavity resonator, means for controlling the frequencies of said resonators comprising axially positionable tuning means supported between *said outer and intermediate conductive cylinders and said intermediate and inner conductive cylinders respectively,* [the respective cylinders,] and coupling means between said anode-grid and grid-cathode resonators.

9. A high frequency cavity resonator *apparatus* [system] comprising an electric discharge device having a plurality of enclosed electrodes including an anode, a cathode, and a grid, a metallic cylinder concentrically surrounding said cathode and supporting said grid, insulating means hermetically sealed between said *metallic* cylinder and said *cathode* [anode], an insulating cylinder hermetically sealed betwen said metallic cylinder and said anode, an inner, an outer, and an intermediate conductive cylinder, in telescoped relation concentrically surrounding said discharge device, said outer cylinder with said intermediate cylinder defining a grid-anode cavity resonator, said intermediate cylinder being conductively connected to said metallic cylinder, said intermediate cylinder with said inner cylinder defining a cathode-grid cavity resonator, means for controlling the frequencies of said resonators comprising axially positionable tuning means supported between *said outer and intermediate conductive cylinders and said intermediate and inner conductive cylinders respectively,* [the respective cylinders,] and cooling means for said anode formed integrally therewith and lying wholly external of said resonators.

10. An electric discharge device having a cylindrical anode, a cylindrical cathode, and a grid in spaced alignment, a metallic cylinder concentrically surrounding said cathode and cooperating therewith to define a portion of a cavity resonator, insulating means hermetically sealed respectively between said metallic cylinder and said anode and between said *metallic* cylinder and said cathode and defining therewith a sealed region, said grid being conductively connected to said cylinder, means external to said device and including a portion of said cylinder defining a cavity resonator between said anode and said grid, said anode being substantially completely external to said last mentioned resonator to facilitate cooling thereof.

11. An electric discharge device having a cylindrical anode, a cylindrical cathode, and a grid in spaced alignment, a metallic cylinder concentrically surrounding said cathode and cooperating therewith to define a portion of a cavity resonator, insulating means hermetically sealed respectively between said metallic cylinder and said anode and between said *metallic* cylinder and said cathode and defining therewith a sealed region, said grid being conductively connected to said cylinder, means external to said device and including a portion of said cylinder defining a cavity resonator between said anode and said grid, and thermally conductive means integral with said anode and external to said last mentioned resonator.

ELMER D. McARTHUR.
JAMES E. BEGGS.

REFERENCES CITED

The following references are of record in the file of this patent or the original patent:

UNITED STATES PATENTS

| Number | Name | Date |
|---|---|---|
| 2,284,405 | McArthur | May 26, 1942 |
| 2,289,846 | Litton | July 14, 1942 |
| 2,331,193 | Hutcheson | Oct. 5, 1943 |
| 2,351,895 | Allerding | June 20, 1944 |
| 2,353,742 | McArthur | July 18, 1944 |
| 2,353,743 | McArthur | July 18, 1944 |
| 2,400,753 | Haeff | May 21, 1946 |
| 2,404,113 | Wagner | July 16, 1946 |
| 2,408,355 | Turner | Sept. 24, 1946 |
| 2,408,927 | Gurewitsch | Oct. 8, 1946 |
| 2,409,640 | Moles | Oct. 22, 1946 |
| 2,411,424 | Gurewitsch | Nov. 19, 1946 |
| 2,427,558 | Jensen et al. | Sept. 16, 1947 |
| 2,427,752 | Strempel et al. | Sept. 23, 1947 |
| 2,445,077 | Nergaard et al. | July 13, 1948 |
| 2,445,992 | Beggs | July 27, 1948 |
| 2,461,125 | Nergaard | Feb. 8, 1949 |